United States Patent
Lee

(10) Patent No.: US 7,630,219 B2
(45) Date of Patent: Dec. 8, 2009

(54) DC TO DC CONVERTER FOR DECREASING SWITCHING LOSS ACCORDING TO THE TURN-ON/TURN-OFF STATE OF A SWITCH

(75) Inventor: Jin-hyung Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 11/651,588

(22) Filed: Jan. 10, 2007

(65) Prior Publication Data

US 2007/0159857 A1    Jul. 12, 2007

(30) Foreign Application Priority Data

Jan. 10, 2006  (KR) .................. 10-2006-0002748

(51) Int. Cl.
*H02M 3/335* (2006.01)
(52) U.S. Cl. ...................... 363/21.16; 363/97
(58) Field of Classification Search ............. 363/21.12, 363/21.16, 97, 131
See application file for complete search history.

(56) References Cited

U.S. PATENT DOCUMENTS

| | | | |
|---|---|---|---|
| 4,783,727 A * | 11/1988 | Neumann | 363/20 |
| 6,314,002 B1 | 11/2001 | Qian et al. | |
| 6,421,255 B1 | 7/2002 | Frebel et al. | |
| 6,473,318 B1 * | 10/2002 | Qian et al. | 363/21.16 |

FOREIGN PATENT DOCUMENTS

| | | |
|---|---|---|
| CN | 1418398 A | 5/2003 |
| DE | 3634990 A1 | 6/1987 |
| DE | 4001325 A1 | 7/1991 |
| EP | 0246491 A2 | 11/1987 |
| EP | 0977346 A1 | 2/2000 |
| JP | 5-103464 A | 4/1993 |
| KR | 2002-0074203 A | 9/2002 |
| WO | 02/41482 A2 | 5/2002 |

OTHER PUBLICATIONS

Varga L D et al.: "A novel lossless snubber circuit", Proceedings of the Annual Applied Power Electronics Conference and Exposition (APEC), vol. 4, Mar. 13, 1989, pp. 40-45, XP010085208.

* cited by examiner

*Primary Examiner*—Jeffrey L Sterrett
(74) *Attorney, Agent, or Firm*—Sughrue Mion, PLLC

(57) ABSTRACT

A direct current (DC) to DC converter is provided. The DC to DC converter includes: a transformer which comprises a primary winding which is connected in series with an input voltage and a secondary winding which generates induced current when the input voltage is applied to the primary winding; a switching part which is connected to the primary winding and performs a switching operation according to a predetermined control signal; a first delay part which delays an increasing rate of voltage between open nodes according to a turned-off state of the switching part and supplies a discharge current when the switching part is turned-on; and a second delay part which delays current flow in the switching part when the first delay part discharges the current when the switching part is turned-on.

11 Claims, 3 Drawing Sheets

DC TO DC CONVERTER FOR DECREASING SWITCHING LOSS ACCORDING TO THE TURN-ON/TURN-OFF STATE OF A SWITCH

CROSS-REFERENCE TO RELATED APPLICATIONS

This application claims priority from Korean Patent Application No. 2006-0002748, filed on Jan. 10, 2006, in the Korean Intellectual Property Office, the disclosure of which is incorporated herein by reference in its entirety.

BACKGROUND OF THE INVENTION

1. Field of the Invention

Methods and apparatuses consistent with the present invention relate to a direct current (DC) to DC converter, and more particularly, to a flyback converter in which a quasi-resonant topology is applied.

2. Description of the Related Art

A related art flyback converter such as a flyback converter with a quasi-resonant topology will be described with reference to FIG. 1. As shown in FIG. 1, the related art flyback converter comprises an input voltage $V_{in}$, a transformer $T_0$ which has a primary winding 100 and a secondary winding 200, and a circuit device such as a metal oxide semiconductor field effect transistor (MOSFET) switch which is repeatedly turned on/off according to a control signal.

The input voltage $V_{in}$ is converted by the transformer $T_0$ according to a turn-on/turn-off state of the MOSFET and is output to DC voltage. However, a switching loss occurs during a turn-on/turn-off state of the MOSFET because the related art flyback converter utilizes energy-conversion when devices such as the MOSFET are used for high-speed switching.

To decrease the switching loss, the quasi-resonant topology is applied to the flyback converter. The flyback converter according to the quasi-resonant topology senses a voltage output from the primary winding 100 when the MOSFET is turned-off based on a minimum voltage of the MOSFET and then turns-on the MOSFET when an output voltage $V_{out}$ becomes the minimum voltage. Accordingly, the switching loss of the flyback converter of the quasi-resonant topology can be decreased when compared with the related art flyback converter when the MOSFET is turned-on.

Also, as shown in FIG. 1, a capacitor Co is connected in parallel with the MOSFET, thereby decreasing a spike of the MOSFET drain-source voltage $V_{ds}$ according to a turn-off state of the MOSFET.

However, in the flyback converter of the quasi-resonant topology, the capacitor Co is discharged through the MOSFET when the MOSFET is turned on. Accordingly, a large lead edge current occurs, resulting in switching loss of the MOSFET when the MOSFET is turned-on.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a DC to DC converter which is capable of decreasing a switching loss according to a turn-on/turn-off state of a switch and which has an improved energy efficiency and a reduced electromagnetic interference (EMI) property.

According to an aspect of the present invention, there is provided a DC to DC converter comprising: a transformer which comprises a primary winding which is connected in series with an input voltage and a secondary winding which generates induced current when the input voltage is applied to the primary winding; a switching part which is connected to the primary winding and performs a switching operation according to a predetermined control signal; a first delay part which delays an increased rate of voltage between open nodes according to a turned-off state of the switching part, and supplies a discharge current when the switching part is turned-on; and a second delay part which delays a current flow in the switching part when a current is discharged by the first delay part when the switching part is turned-on.

According to an aspect of the present invention, the first delay part comprises a capacitor of which a first side is connected to the primary winding and the switching part and which is charged with voltage from the primary winding when the switching part is turned-off and discharges the charged voltage to the switching part when the switching part is turned-on.

According to an aspect of the present invention, the first delay part comprises a first diode of which an anode terminal is connected to a second side of the capacitor and a cathode terminal is connected to the input voltage to control a current flow.

According to an aspect of the present invention, the second delay part comprises an inductor which is connected to a ground of the switching part and a second side of the capacitor and coupled with the primary winding and delays current flow in the switching part when the capacitor discharges a current when the switching part is turned-on.

According to an aspect of the present invention, the inductor is wound in an opposite direction to the primary winding.

According to an aspect of the present invention, the second delay part comprises a second diode of which an anode terminal is connected to the inductor and a cathode terminal is connected to the first side of the capacitor and the anode terminal of the first diode.

According to an aspect of the present invention, the switching part comprises a MOSFET.

According to an aspect of the present invention, the transformer comprises a flyback transformer.

According to an aspect of the present invention, the DC to DC converter further comprises a switching control part which senses a voltage output from the primary winding and applies a turn-on control signal to the switching part if the voltage is a minimum voltage when the switching part is turned-off.

BRIEF DESCRIPTION OF THE DRAWINGS

The above and/or other aspects of the prevent invention will become apparent and more readily appreciated from the following description of the exemplary embodiments, taken in conjunction with the accompany drawings, in which.

DETAILED DESCRIPTION OF EXEMPLARY EMBODIMENTS OF THE INVENTION

Figure 1:
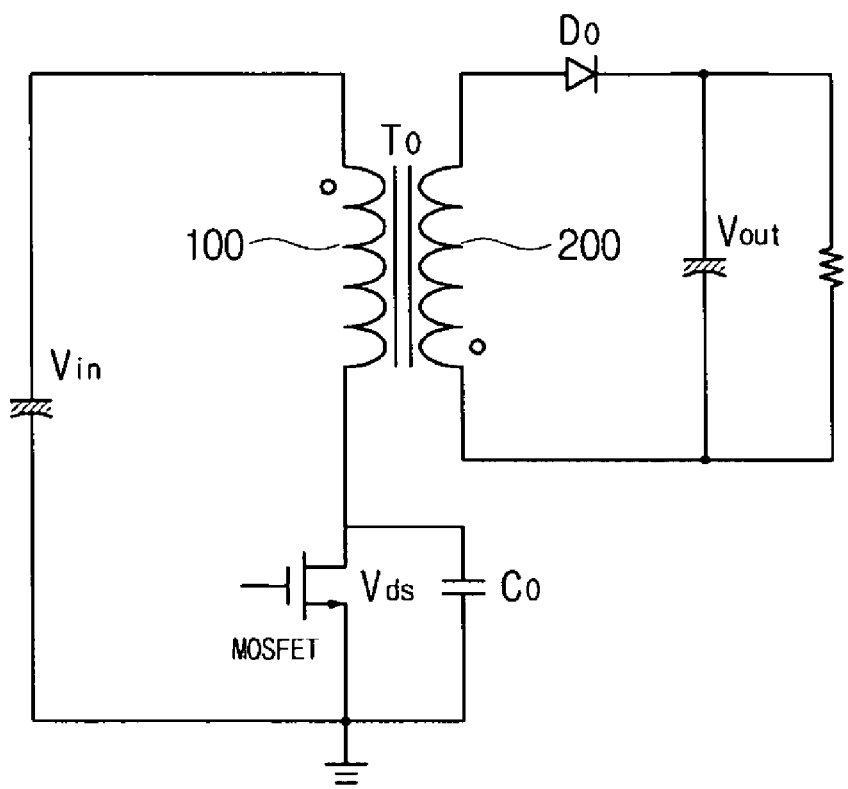
FIG. 1 is a drawing illustrating a control block diagram of a related art flyback converter and a flyback converter according to a quasi-resonant topology.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the drawings. A flyback converter in which a quasi-resonant topology is applied will be described as an exemplary embodiment of the present invention.

Figure 2:
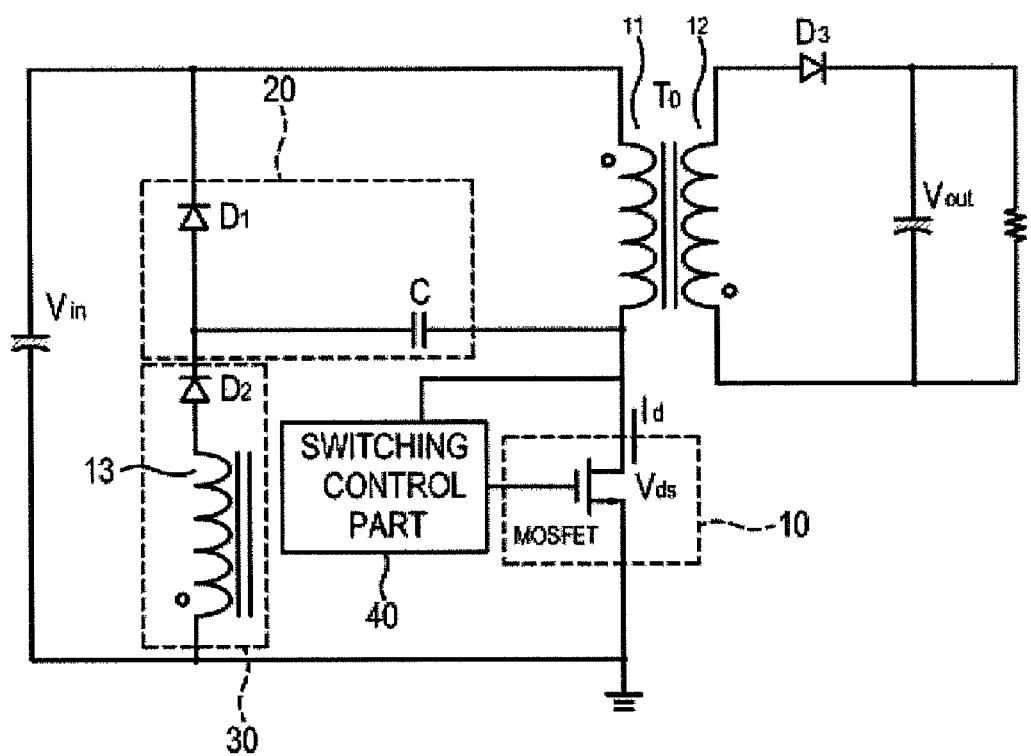
FIG. 2 is a circuit configuration of the flyback converter according to an exemplary embodiment of the present invention.

FIG. 2 is a circuit diagram of a flyback converter according to an exemplary embodiment of the present invention. As shown in FIG. 2, the flyback converter, which converts an input DC voltage $V_{in}$ into DC voltage of a predetermined level, may be divided into an input circuit having a primary winding 11 and an output circuit having a secondary winding 12.

The input circuit comprises the input voltage $V_{in}$ supplying a DC voltage, the primary winding 11 of a transformer $T_0$, a switching part 10, a first delay part 20 and a second delay part 30.

Here, the switching part 10 is connected between the primary winding 11 and the input voltage $V_{in}$ in series and performs a switching operation. As shown in FIG. 2, the switching part 10 may be implemented by a switching device such as a MOSFET and the like. The MOSFET receives a predetermined switching control signal and repeats a turn-on/turn-off operation in high speed. The flyback converter according to the exemplary embodiment of the present invention in which the quasi-resonant topology is applied may comprise a switching control part 40. A specific operation of the switching control part 40 will be described later.

The first delay part 20 according to the exemplary embodiment of the present invention delays an increasing rate of voltage between open nodes according to a turned-off state of the switching part 10 and supplies a discharge current when the switching part 10 is turned-on. Also, the first delay part 20 may comprise a capacitor C and a first diode D1.

Particularly, as shown in FIG. 2, a first side of the capacitor C is connected with the primary winding 11 and the MOSFET. Accordingly, the capacitor C is charged with voltage output from the primary winding 11 according to the input voltage $V_{in}$ when the MOSFET is turned-off. An anode terminal of the first diode D1 is connected with a second side of the capacitor C and a cathode terminal of the first diode D1 is connected with the input voltage $V_{in}$. Accordingly, the first diode D1 controls a flow of the charged current in one direction.

In other words, the capacitor C is charged with the voltage output from the primary winding 11 when the MOSFET is turned-off and then delays an increase of a MOSFET drain-source voltage $V_{ds}$. Accordingly, a switching loss may be decreased when the MOSFET is turned-off. Also, the charged voltage of the charged capacitor C is discharged to the MOSFET when the MOSFET is turned-on.

The second delay part 30 according to the exemplary embodiment of the present invention delays a current flow in the switching part 10 when the first delay part 20 discharges a current when the switching part 10 is turned-on. The second delay part 30 may be implemented by an inductor 13 which is coupled with the primary winding 11 and a second diode D2.

Particularly, as shown in FIG. 2, the inductor 13 is connected with a ground of the MOSFET and the second side of the capacitor C and delays a current flow in the MOSFET when the capacitor C discharges a current when the MOSFET is turned-on. Accordingly, a switching loss may be decreased when the MOSFET is turned-on.

Here, the inductor 13 is wound in an opposite direction as compared with the primary winding 11 and therefore, a polarity thereof is opposed to the primary winding 11. Accordingly, the inductor 13 delays current flow to the MOSFET through the capacitor C. On the other hand, an anode terminal of the second diode D2 is connected with the inductor 13 and a cathode terminal of the second diode D2 is connected with the second side of the capacitor C and the anode terminal of the first diode D1. Accordingly, the second diode D2 controls a flow of the discharged current in the capacitor C in one direction.

The output circuit of the flyback converter according to the exemplary embodiment of the present invention is operated according to an indirect energy transfer. As shown in FIG. 2, the transformer $T_0$ is charged with magnetized inductance when the MOSFET is turned-on and current of the magnetized inductance in the transformer $T_0$ transfers to the secondary winding 12 when the MOSFET is turned-off and then the output voltage is generated in the output circuit.

Particularly, voltage having polarity opposite to the primary winding 11 is induced into the secondary winding 12 of the transformer $T_0$ when the MOSFET is turned-on and thus a third diode D3 is reverse-biased and then is shut. Accordingly, current does not flow in the secondary winding 12 but only flows in the primary winding 11. Then, energy is accumulated in the transformer $T_0$ by the magnetized inductance. Also, voltage having polarity opposite to the former state is induced into the secondary winding 12 when the MOSFET is turned-off and then is passed through the third diode D3 so that the energy accumulated by the magnetized inductance of the transformer $T_0$ is released as output voltage.

A waveform of the flyback converter according to the exemplary embodiment of the present invention will be described referring to FIG. 3.

Figure 3:
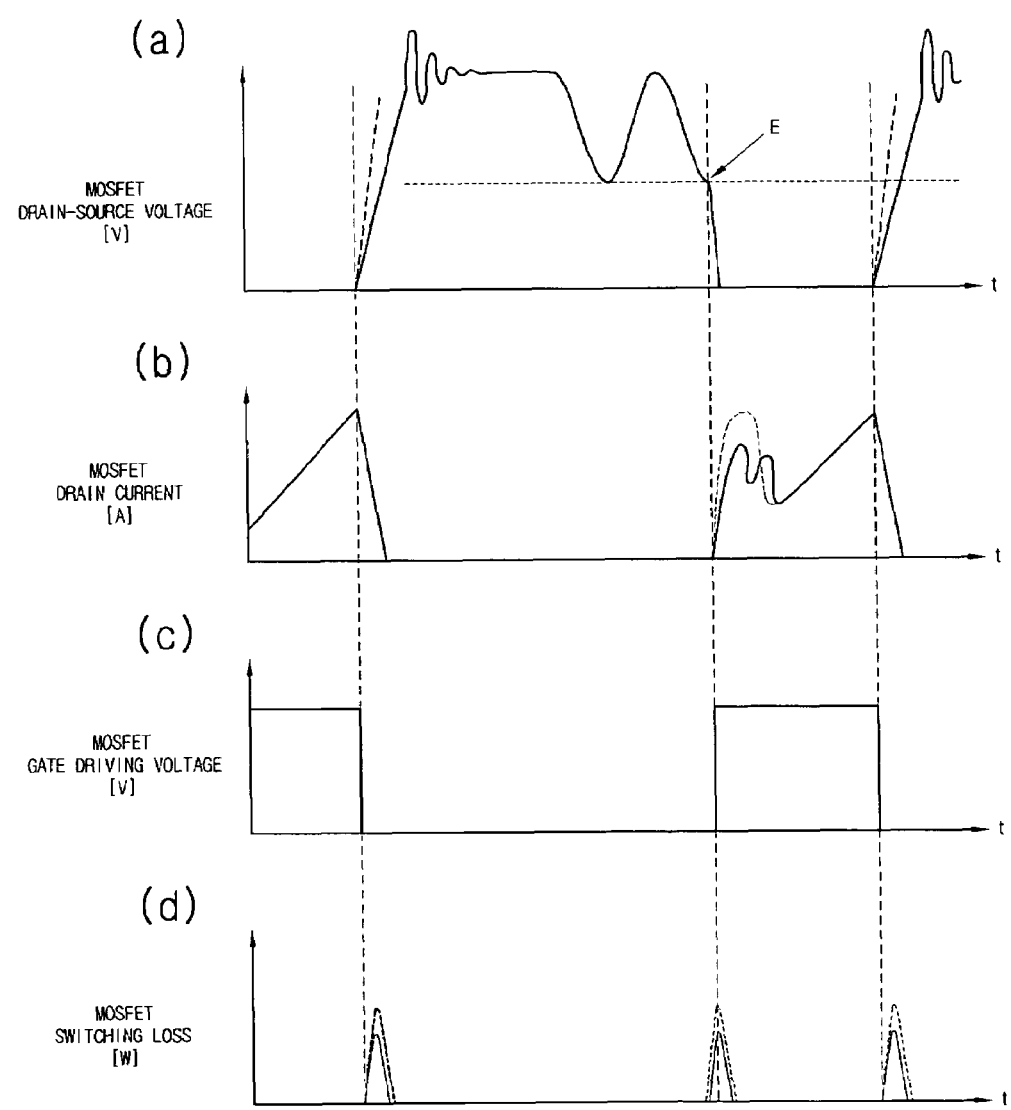
FIG. 3 illustrates operational waveforms of the flyback converter according to FIG. 2.

In FIG. 3, (a) illustrates a waveform of the MOSFET drain-source voltage $V_{ds}$, (b) illustrates a waveform of the MOSFET drain current $I_d$, (c) illustrates a waveform of the MOSFET gate driving voltage, and (d) illustrates a waveform of a switching loss of the MOSFET.

As shown in (c), when the MOSFET is turned-off, the MOSFET drain-source voltage $V_{ds}$ and the MOSFET drain current $I_d$ are illustrated in (a) and (b), respectively. As shown in (a), the MOSFET drain-source voltage $V_{ds}$ is abruptly increased when the MOSFET is turned-off. As mentioned above, a current path according to the exemplary embodiment of the present invention is formed through the MOSFET, the capacitor C and the first diode D1, and then the capacitor C is charged by a voltage output by the transformer. Accordingly, the increasing rate (dV/dT) of the MOSFET drain-source voltage $V_{ds}$ is delayed.

Accordingly, as shown in (a), the increasing rate (dV/dT) is delayed and decreased as compared with the related art increasing rate so that a voltage spike can be removed when the switching part is turned-off. In case of multi-output power, a property of a cross load regulation may be improved by improving the voltage spike.

A turn-off switching loss is illustrated as shown in (d). A dotted line illustrates a switching loss of the related art flyback converter and a solid line illustrates a switching loss of the flyback converter according to the exemplary embodiment of the present invention. As mentioned above, the increasing rate (dV/dT) of the MOSFET drain-source voltage $V_{ds}$ is delayed and decreased and switching loss power L calculated by the following Equation 1 is decreased as compared with related art switching loss power.

$$L=V_{ds}*I_d \qquad \text{Equation 1:}$$

In other words, as a turn-off time of the MOFET becomes slow, the turn-off switching loss that occurs when an overlap between the MOSFET drain-source voltage $V_{ds}$ and the MOSFET drain current $I_d$ is decreased.

On the other hand, as mentioned above, the flyback converter according to the exemplary embodiment of the present invention further comprises a switching control part 40 which applies a switching control signal to the MOSFET. The switching control part 40 comprises an auxiliary winding (not shown) connected with the primary winding 11, and a sensor (not shown) which is connected with the auxiliary winding and which senses the MOSFET drain-source voltage $V_{ds}$. Also, the switching control part 40 supplies MOSFET turn-on/turn-off timing.

Particularly, the MOSFET drain-source voltage, $V_{ds}$ according to a turn-off state of the MOSFET is overshot and is then maintained at a constant level. Then, in case of having a well-balance, the MOSFET drain-source voltage $V_{ds}$ is oscillated and converged in the constant level. The switching control part 40 senses the MOSFET drain-source voltage $V_{ds}$ and then applies the switching control signal so that the oscillating MOSFET drain-source voltage $V_{ds}$ is synchronized to a timing that corresponds to the minimum level E of the MOSFET driving voltage in FIG. 3A and the MOSFET is turned-on.

Accordingly, the switching loss according to a turn-on state of the switching part may be decreased. In other words, a clamping circuit comprising the capacitor C is applied to the flyback converter of the quasi-resonant topology so that the turn-off switching loss may be decreased.

Also, a current path is formed through the capacitor C, the MOSFET, the inductor 13 and the second diode D2 and then a voltage charge in the capacitor C is discharged when the MOSFET is turned-on. Here, the MOSFET drain current $I_d$ is delayed and decreased because the MOSFET drain current $I_d$ is limited by the inductor 13. In other words, a turn-on lead edge current occurs when current is discharged by the capacitor C when the MOSFET is turned-on. The turn-on lead edge current is decreased by the inductor 13 according to the following Equation 2 and reduces the turn-on lead edge current.

$$I_d=C(V_{ds}-V_c)/dT \qquad \text{Equation 2:}$$

Here, $V_c$ means voltage applied between both sides of the capacitor C.

Accordingly, as shown in (d) of FIG. 3, the switching loss that occurs when the switching part of the flyback converter is turned on according to the exemplary embodiment of the present invention is decreased as compared with the related art switching loss displayed as the dotted line. Accordingly, the flyback converter according to the exemplary embodiment of the present invention can reduce the turn-on edge current that occurs when the switching part is turned on and an EMI property and efficiency can therefore be improved.

In the aforementioned exemplary embodiment of the present invention, the DC to DC converter which is capable of decreasing a switching loss that occurs when a switch is turned on or off, and which has improved an energy efficiency and an EMI property is provided.

It will be apparent to those skilled in the art that various modifications and variations can be made in the exemplary embodiment of the present invention without departing from the spirit or scope of the invention. Thus it is intended that the present invention cover the modifications and variations of this invention provided they come within the scope of the appended claims and their equivalents.

What is claimed is:

1. A direct current (DC) to DC converter comprising:
   a transformer which comprises a primary winding which is connected in series with an input voltage, and a secondary winding which generates an induced current when the input voltage is applied to the primary winding;
   a switching part which is connected to the primary winding and performs a switching operation according to a control signal;
   a first delay part which delays an increasing rate of voltage between open nodes according to a turned-off state of the switching part and supplies a discharge current when the switching part is turned-on;
   a second delay part which delays a current flow in the switching part when the first delay part discharges the current when the switching part is turned-on; and
   a switching control part which senses a voltage output from the primary winding and applies a turn-on control signal to the switching part if the voltage is a minimum voltage when the switching part is turned-off.

2. The DC to DC converter according to claim 1, wherein the switching part comprises a metal-oxide semiconductor field effect transistor (MOSFET).

3. The DC to DC converter according to claim 1, wherein the first delay part comprises a capacitor having a first side which is connected to the primary winding and the switching part and which is charged with voltage from the primary winding when the switching part is turned-off and discharges the charged voltage to the switching part when the switching part is turned-on.

4. The DC to DC converter according to claim 3, wherein the second delay part comprises an inductor which is connected to a ground of the switching part and a second side of the capacitor and coupled with the primary winding and delays the current flow in the switching part when a current is discharged by the capacitor when the switching part is turned-on.

5. The DC to DC converter according to claim 4, wherein the inductor is wound in a direction opposite to a winding direction of the primary winding.

6. The DC to DC converter according to claim 4, wherein the second delay part comprises a second diode having an anode terminal which is connected to the inductor and a cathode terminal which is connected to one side of the capacitor and an anode terminal of a first diode.

7. The DC to DC converter according to claim 3, wherein the first delay part further comprises a first diode having an anode terminal which is connected to a second side of the capacitor and a cathode terminal which is connected to the input voltage to control a current flow.

8. The DC to DC converter according to claim 7, wherein the second delay part comprises an inductor which is connected to a ground of the switching part and a second side of the capacitor and coupled with the primary winding and delays the current flow in the switching part when a current is discharged by the capacitor when the switching part is turned-on.

9. The DC to DC converter according to claim 8, wherein the second delay part comprises a second diode having an anode terminal which is connected to the inductor and a cathode terminal which is connected to one side of the capacitor and the anode terminal of the first diode.

10. The DC to DC converter according to claim 8, wherein the inductor is wound in an opposite direction to the primary winding.

11. The DC to DC converter according to claim 1, wherein the transformer comprises a flyback transformer.

* * * * *